J. G. VINCENT.
POWER DRIVE FOR ADDING MACHINES.
APPLICATION FILED AUG. 6, 1906.
989,670.
Patented Apr. 18, 1911.
6 SHEETS—SHEET 1.
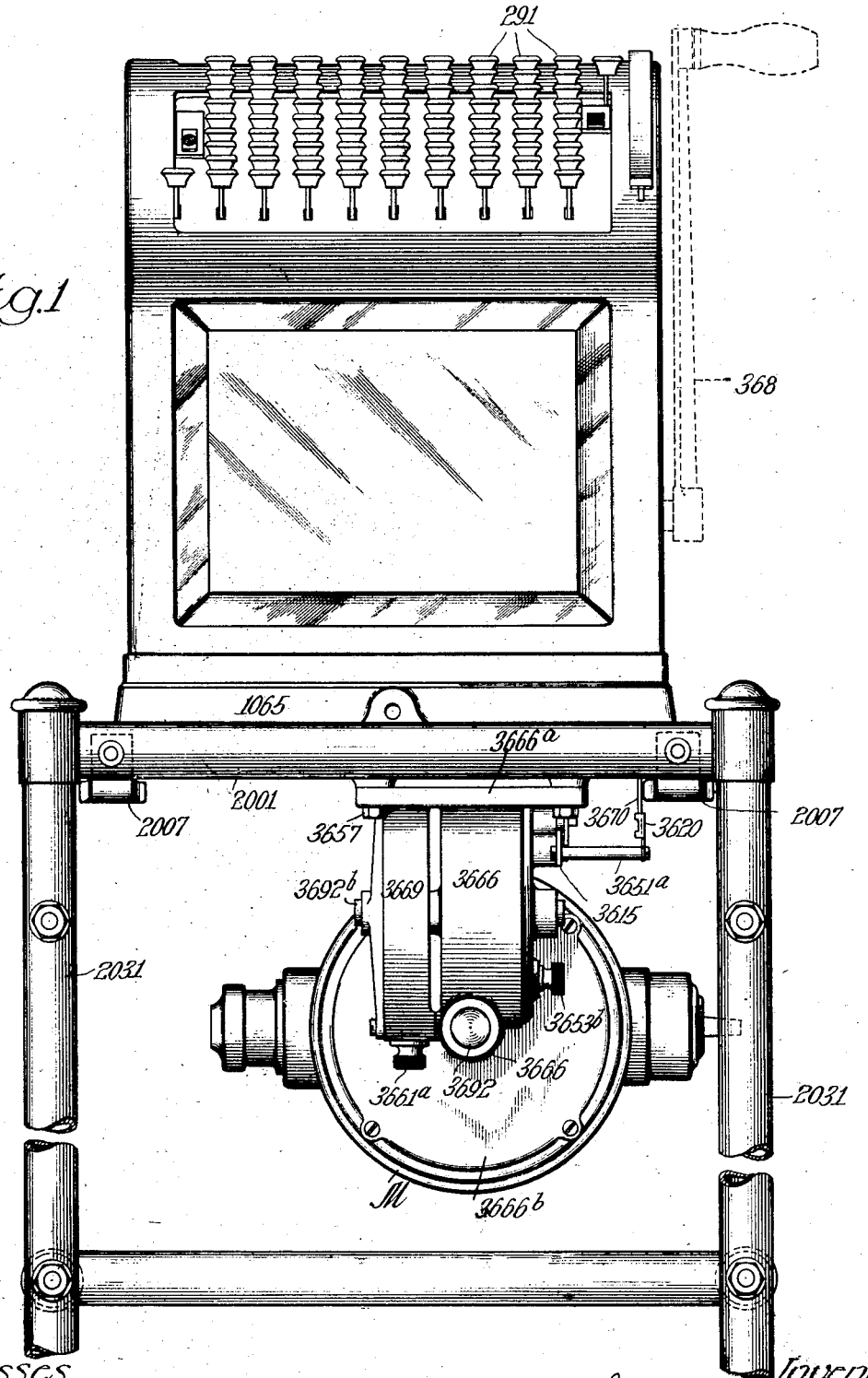

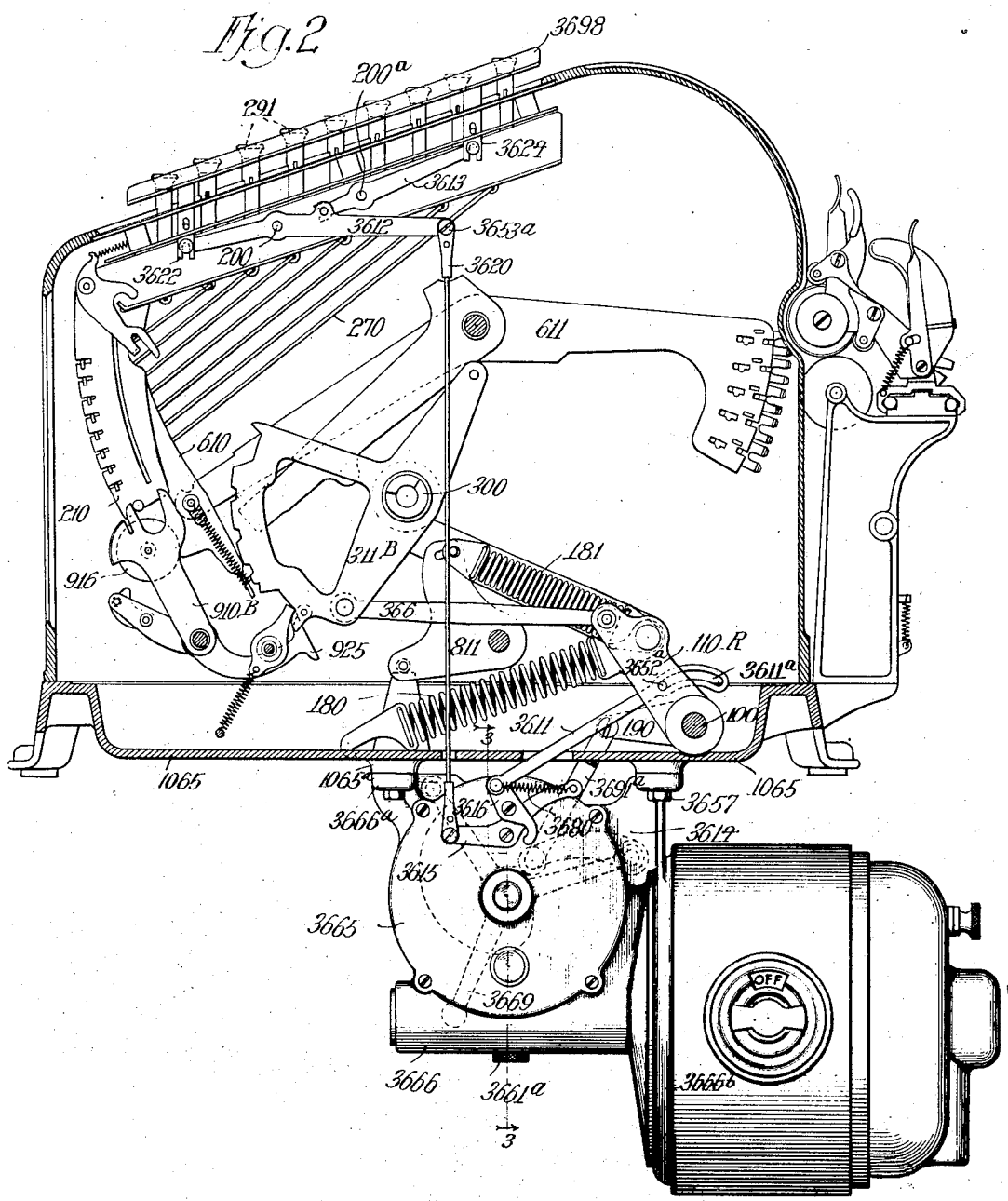

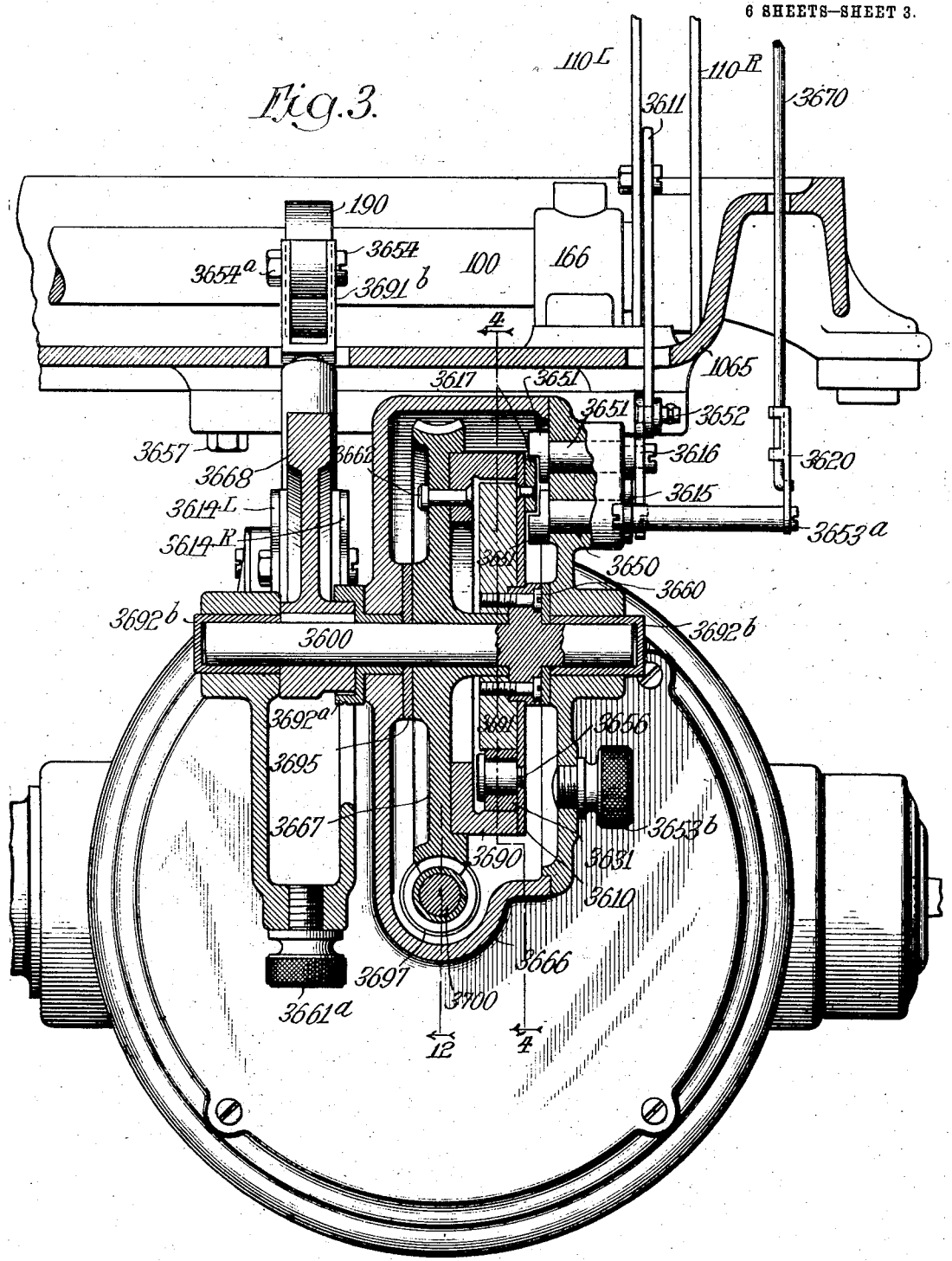

J. G. VINCENT.
POWER DRIVE FOR ADDING MACHINES.
APPLICATION FILED AUG. 6, 1906.
989,670.
Patented Apr. 18, 1911.
6 SHEETS—SHEET 4.
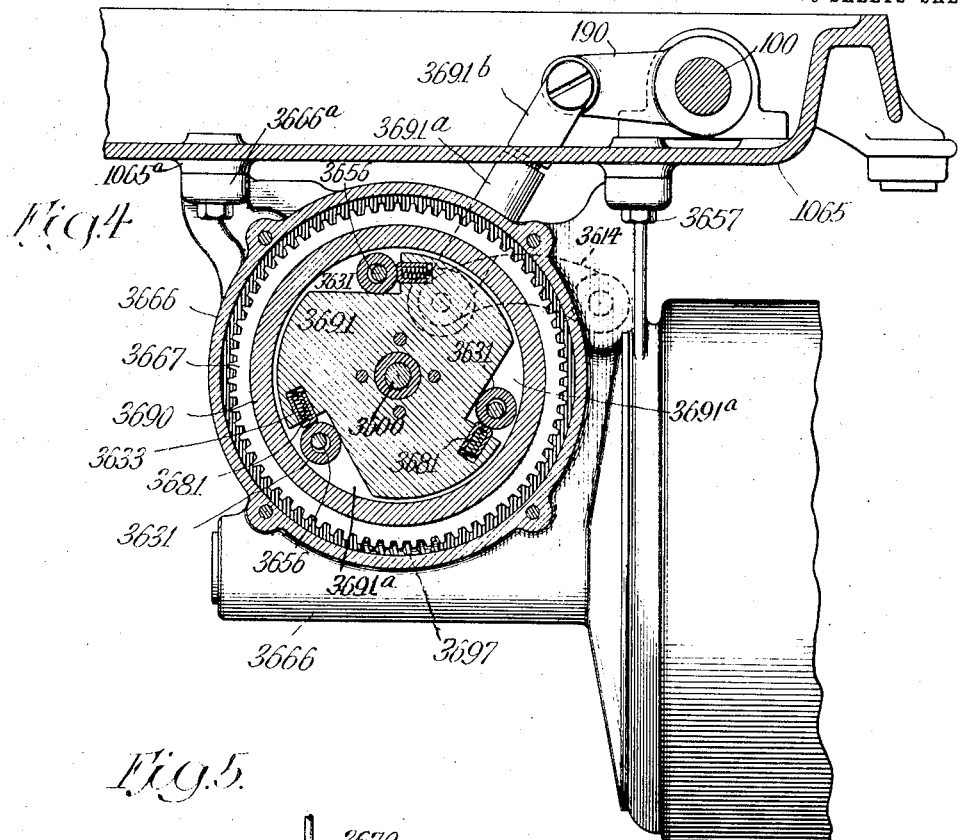
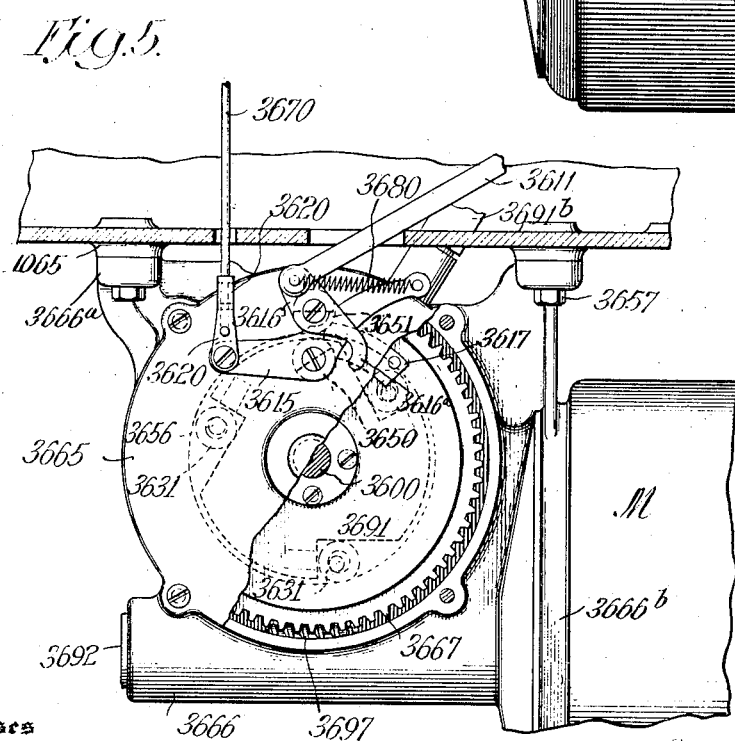

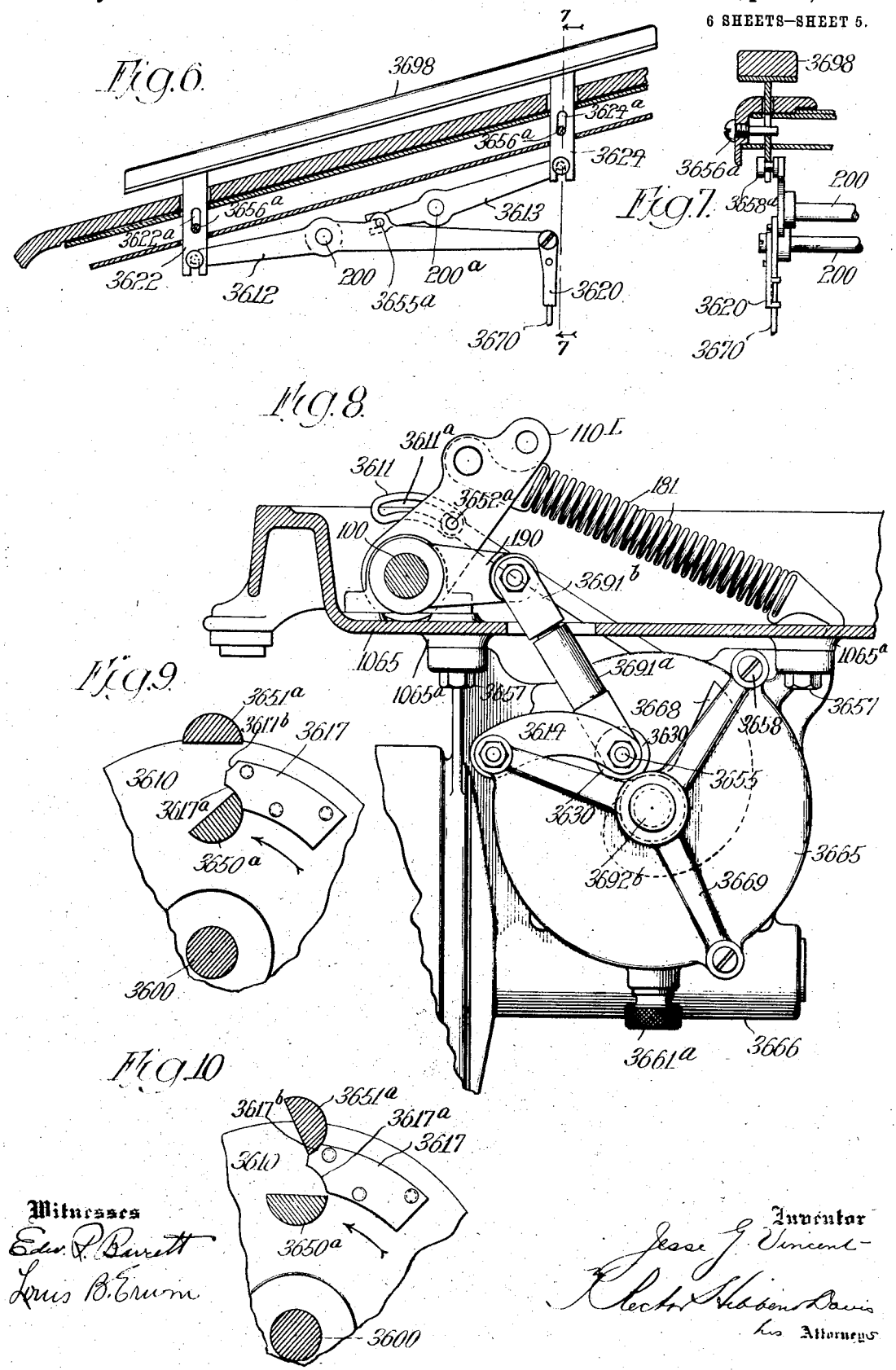

J. G. VINCENT.
POWER DRIVE FOR ADDING MACHINES.
APPLICATION FILED AUG. 6, 1906.
989,670.
Patented Apr. 18, 1911.
6 SHEETS—SHEET 6.
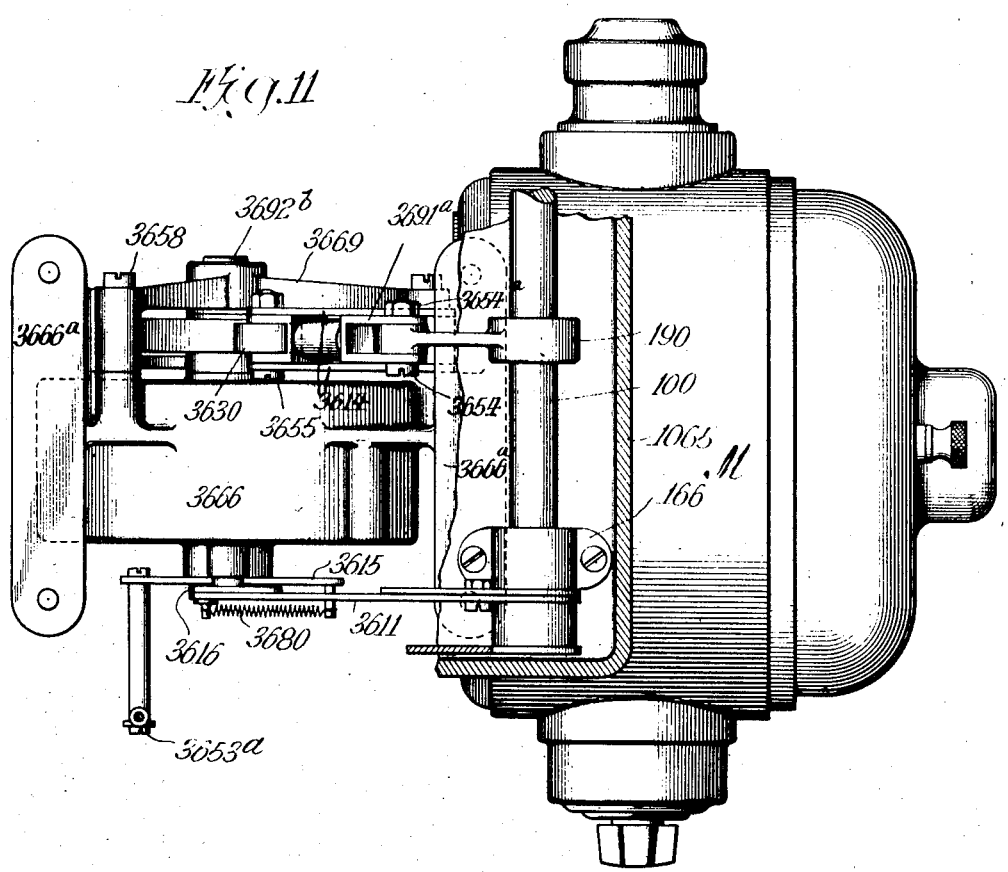
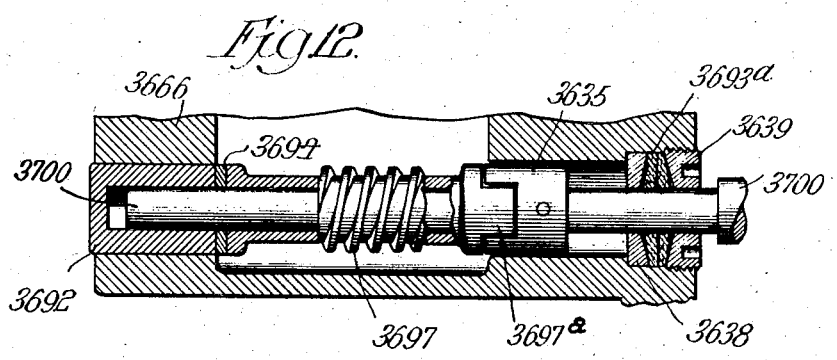

UNITED STATES PATENT OFFICE.

JESSE G. VINCENT, OF DETROIT, MICHIGAN, ASSIGNOR TO BURROUGHS ADDING MACHINE COMPANY, OF DETROIT, MICHIGAN, A CORPORATION OF MICHIGAN.

POWER-DRIVE FOR ADDING-MACHINES.

989,670.

Specification of Letters Patent.

Patented Apr. 18, 1911.

Application filed August 6, 1906. Serial No. 329,386.

*To all whom it may concern:*

Be it known that I, JESSE G. VINCENT, a citizen of the United States, residing at Detroit, in the county of Wayne and State of Michigan, have invented certain new and useful Improvements in Power-Drives for Adding-Machines, of which the following is a specification.

The object of the present invention generally stated is to provide for greater efficiency and facility in the application to adding machines and the like of power to take the place of the usual manually-operated driving means.

More specifically stated the objects are to provide an improved form of releasing or starting device which may extend along the customary key-board of an adding machine from front to rear thereof and at the same time operate uniformly regardless of the particular point at which pressure is applied; further to provide improved detent devices for a continuously running motor, which devices will provide for indefinite repetitions in operations of the machine by simply holding the releasing or starting device displaced while at the same time permitting the working parts of the adding machine proper to complete a cycle of operation before power is applied to repeat such operation; further to provide driving connections between the motor and the adding machine which will leave the latter equipped for manual operation without any disconnection from the motor, the power drive being applied to a different part of the adding machine from that to which the customary handle is applied; further to provide an improved form of operating connection between the motor and the adding machine which will insure ease and uniformity in the transmission of power; further to provide for attaching the motor to the adding machine in such manner as to provide for interchangeability as in the case of electric motors to meet the requirements of different voltages or currents in different localities.

With these and incidental objects in view such as durability and compactness in construction and protection of parts from dirt and dust, the present invention consists in certain novel features of construction and combinations of parts the essential elements whereof are recited in the appended claims and a preferred form of embodiment of which is illustrated in detail in the accompanying drawings and fully described hereinafter.

Of said drawings Figure 1 represents in front elevation an adding machine of the well known Burroughs type mounted upon a stand and having applied to it an electric motor drive embodying the present invention; Fig. 2 represents the same machine and motor drive in right-side elevation, the supporting stand being omitted and the casing of the adding machine proper being shown in section; Fig. 3 represents an enlarged cross-section taken on the line 3—3 of Fig. 2; Fig. 4 represents a longitudinal section from front to rear taken substantially on the line 4—4 of Fig. 3; Fig. 5 is a view similar to the lower part of Fig. 2 but on a larger scale and showing part of the gear casing broken away; Fig. 6 shows part of the adding machine key-board in longitudinal section from front to rear together with the manually-operated motor releasing devices in side elevation; Fig. 7 represents a vertical cross-section taken on the line 7—7 of Fig. 6; Fig. 8 represents a left-side elevation of part of the motor drive together with parts of the adding machine with which it is operatively connected, part of the casing of the adding machine being shown in section; Figs. 9 and 10 are details of the detent devices illustrating the different positions they assume in an operation of the adding machine; Fig. 11 represents the motor drive in top plan view together with the adding machine parts with which the same is directly connected, a portion of the adding machine casing appearing in horizontal section; and Fig. 12 is a longitudinal section substantially on the line 12—12 of Fig. 3.

For the purposes of the present specification the invention is illustrated as applied to the well known Burroughs type of adding machine exemplified in the William S. Burroughs Patents Nos. 504,963 and 505,078, issued September 12, 1893, but it is of course to be understood that the invention is not limited in its application to this particular type of adding machine but may be advantageously employed as an attachment to or improvement upon other types of such machines, the invention not relating at all to the particular form of means whereby the usual functions of an adding machine are performed. It will not be necessary to enter into a detailed explanation of the character of such means in a Burroughs machine. It has been customary in this as well as in other makes of adding machines to operate the same by drawing forward a crank handle or lever and then releasing the same to be returned to its normal position by springs. In the accompanying drawings the reference numeral 300 designates the usual oscillatory shaft or stud of a Burroughs machine to which such a crank handle is customarily applied as indicated by the dotted lines in Fig. 1 where the numeral 368 designates the crank handle. This oscillatory shaft carries affixed to it a sector plate 311$^B$ which is connected through the medium of a link 366 with a crank arm 110$^R$ secured to another rock-shaft 100 journaled in the base 1065 of the adding machine. Strong spiral springs 180 extend between said base and a cross-rod connecting said crank arm 110$^R$ with a companion crank arm at the opposite side of the machine and it will be seen that the drawing forward of an upstanding crank handle applied to the shaft 300 will result in forcing rearwardly the crank arm 100$^R$ against the tension of the springs 180 so that upon the release of such crank handle at the end of its forward movement said springs will restore the parts to their original or normal positions. It is customary to employ some character of retarding means such as a dash-pot to prevent too speedy an operation of these parts to allow for the necessary action of the accumulating and listing devices within the adding machine proper but it is hardly necessary to illustrate or describe this well known expedient which furthermore is portrayed in the above mentioned Burroughs patents.

According to the present invention and unlike that of my prior Patent No. 858,548 issued July 2, 1907, the shaft 300 is left free for the application thereto of the usual crank handle or operating lever and the power drive is operatively connected with the shaft 100 but in such manner that the machine may at any time be operated by hand without any appreciable resistance due to the motor connections. There is secured to this shaft 100 (Fig. 8) a short crank arm 190 normally extending forward about horizontally within the base 1065. The outer end of this crank arm is formed as a boss lying in the bifurcation of one member 3691$^b$ of a two-part adjustable pitman, the other member 3691$^a$ of which is formed to receive the screw-threaded stem of the first mentioned member. The pitman and crank arm are pivotally connected by a screw 3654 and nut 3654$^a$ (Fig. 11) and the pitman extends through a suitable opening in the base 1065 of the adding machine. The lower end of the pitman member 3691$^a$ is bifurcated to accommodate an anti-friction roller 3630 designed to coöperate with a snail-back cam 3668 keyed to a motor-driven shaft 3600, the rotation of which results in the said pitman being thrust upwardly through the action of the back of the cam against the roller 3630 and in said pitman rocking the crank arm 110$^R$ rearwardly against the tension of the spring 180. When the point of the cam passes the roller of course said spring restores said crank arm and connected parts to normal. In order to insure ease and uniformity in this transmission of power to the adding machine the lower end of the above described pitman is connected by radius links 3614 with a suitable support on the casing 3669 which incloses the cam 3668, said links being pivotally connected with the pitman by a stud 3655 constituting the journal of the anti-friction roller 3630. The casing 3669 is formed with a central bearing for one end of the shaft 3600 and this casing in its lower part constitutes a drip cup for oil which may exude from the bearings of said shaft, see Fig. 3. Said casing is united by screws 3658 extending through bosses at the ends of ribs 3669, with a gear casing 3666 which is formed at front and rear with flanges 3666$^a$ to fit against four finished bosses 1065$^a$ on the underside of the base of the adding machine, said flanges being secured to said bosses by suitable screws 3657 as shown in Fig. 2. In this manner the gear casing is securely fastened to the bottom of the adding machine in proper position to bring about the desired coöperation between the driving cam 3668 and the working parts of the adding machine.

The shaft 3600 extends through the casing 3666 as well as the casing 3665 and is provided with bearings in both, caps 3692$^b$ being preferably employed to inclose the ends of the shaft and protect the bearings and a bushing 3692$^a$ being preferably employed at the middle bearing of the shaft with a laterally projecting flange extending into the interior of the casing 3669 for the purpose of conveying such oil thereto as may exude from this shaft bearing. There is loosely mounted upon the shaft 3600 within the casing 3666 a worm-wheel 3667 which engages a worm 3697 sleeved upon the armature shaft 3700 (Fig. 12) and rotatably connected therewith through the medium of clutch members 3635 and 3697$^a$. Where said shaft 3700 enters the casing 3666 a suitable stuffing box is provided comprising washers 3638 and a screw plug 3639, and at its outer end said shaft is inclosed by a cap 3692 for excluding dust and dirt from the shaft bearing. A fiber washer 3694 interposed between the worm sleeve and said cap takes the thrust of the worm gear.

It will be seen that through the above described connections rotations of the armature shaft will be transmitted through the worm to the worm-wheel. The latter conveys rotation through clutch mechanism hereinafter described to the shaft 3600 for imparting the hereinbefore described movement to the adding machine parts.

When employed with a power drive it is customary to mount the adding machine upon a stand and in the present instance such stand is shown in Fig. 1 as composed of uprights 2031 and upper and lower cross-bars, one of which is designated 2001. The latter and the corresponding cross-bar at the rear have secured to them brackets 2007 forming rests for the feet of the adding machine. Within the confines of this supporting stand the motor attachment is accommodated, the gear casing being suspended from the bottom of the adding machine in the manner above described. This casing is formed at the rear with a circular flange 3666$^b$ which is machined to fit the corresponding flange of a standard electric motor such as shown in the drawings and designated by the letter M, these flanges being suitably clamped together by removable fastenings. This arrangement provides for readily interchanging motors, it being merely necessary to have the flanges made to a standard size. The changing of motors will be seen not to in any case affect the gear connections hereinbefore described. The motor is shown with a common form of wall plug at the left and an equally well-known form of on-and-off switch at the right and it will be seen that when located in the manner described the motor is readily accessible while at the same time out of the way of the operator and not requiring any additional lateral space as compared with that occupied by a manually operated adding machine mounted upon a stand in the ordinary way.

The clutch above mentioned is of the following description: A hardened ring 3690 is secured to one side of the worm wheel 3667 by rivets 3662 as shown in Fig. 3, and there is secured by screws 3660 to a flange of the shaft 3600 a disk 3691 occupying the interior of said ring. The disk is formed at its periphery with a number of triangular notches 3691$^a$ containing rolls 3631 which are thrust toward the shallow ends of the notches by springs 3681 for the purpose of establishing a driving engagement between the ring and the disk and thereby operatively connecting the motor with the adding machine through the train of mechanism already described. Said springs are suitably housed and accommodated in recesses of the disk and are normally restrained by reason of the engagement of pins or studs 3656 with the interiors of the rolls, said studs being carried by a plate or disk 3610 mounted to rotate upon a reduced portion of the shaft flange which carries the disk 3691 as shown in Fig. 3. This plate or disk has secured to its outer side near its periphery an elongated stop lug 3617 curved on its inner and outer longitudinal edges concentrically with the shaft 3600 and formed at one end with curved edges 3617$^a$ and 3617$^b$. Rotation of this disk 3691 is normally prevented by the engagement with the curved edge 3617$^a$ of the rounded part of a semi-circular projection 3650 on the flanged end of a plug 3650$^a$ mounted to rock in a bearing or boss of the gear casing as shown in Fig. 3. This plug or stub shaft has secured to its outer end a crank arm 3615 which is jointed to a bracket 3620 holding the lower end of a vertically movable rod 3670 forming part of the starting or releasing devices hereinafter described through which the operator sets the machine in operation. Upward movement of the crank arm 3615 turns the plug 3650$^a$ in a direction to disengage its semi-circular portion 3650 from the stop lug 3617. The normal relation of these parts is illustrated in Fig. 9 and it will be seen that when said plug is turned in the manner described the disk 3610 will be freed. The springs 3681 thereupon thrust the rolls 3631 forward carrying the said disk along and rotative engagement is immediately established between the clutch parts in an obvious manner.

In order to prevent the possibility of the motor cam arriving at a position to start a second operation of the adding machine before the first has come to an end a second detent device is provided to coöperate with the disk 3610 in a somewhat similar manner to that in which the first described detent device comprising the semi-circular part 3650 coöperates with said disk. This second detent is in the form of a plug or stub shaft 3651 similar to the plug 3650$^a$ and similarly flanged at its inner end and formed with a semi-circular projecting portion 3651$^a$ whose flat side or edge confronts the flat side or edge of the similar part 3650 of the first described detent device as shown in Fig. 9. This second detent device stands normally out of the path of the stop lug 3617 as shown in this figure and is wholly under the control of the moving parts of the adding machine so that it comes into play automatically as a result of the working parts of the adding machine being in operation. The purpose is to interpose this stop in the path of the lug 3617 to prevent its starting on a second rotation until the adding machine has completed its cycle of operation, so that holding down of the starting device hereinafter described will not result in driving the adding machine beyond its speed capacity. As the adding machine starts to operate this detent 3651 rocks so as to take up the position shown in Fig. 10 where its curved surface is positioned for engagement with the curved edge 3617ᵇ of the stop lug 3617. The two curved edges 3617ᵃ and 3617ᵇ are so formed and the two detent devices so located as to provide for a slight clearance between the manually controlled detent and the curved edge 3617ᵃ of the stop lug when the other curved edge 3617ᵇ of said lug is engaging the automatic detent 3651. It results that when the disk 3610 is stopped by said automatic detent it is slightly short of its normal position, viz., that determined by its engagement with the manually controlled detent 3650. Thus in this normal position of said disk its stop lug 3617 is advanced slightly beyond a location in which the automatic detent 3651 can, by turning in its bearings, engage the curved edge 3617ᵇ. It also follows of course that when the disk is stopped by the automatic detent the manually operated detent can freely take up its normal position in front of the edge 3617ᵃ of the stop lug.

The connections between the second detent plug or stub shaft 3651ᵃ and the working parts of the adding machine are of the following description. A short crank arm 3616 is secured to the outer end of said plug or stub shaft and is connected by a link 3611 with the crank arm 110ᴿ of the adding machine through the medium of a curved slot 3611ᵃ in the link and a pin 3652ᵃ in said last-named crank arm, see Fig. 2. A spiral spring 3680 connected at one end to an extension of the crank arm 3615 in rear of the stub shaft 3651ᵃ and at the other end to the pivot pin connecting the crank arm 3613 with the link 3611, serves the double purpose of rocking the manually controlled detent to an operative position and the automatic detent to an operative position, an extension 3616ᵃ of said crank arm 3616 limiting the movement of the latter by abutting the pivot screw of the crank arm 3615. In the normal position of parts the crank arm 110ᴿ of the adding machine drawn forward by the heavy spring 180 holds the link 3611 thrust forwardly and thus maintains the detent 3651 in its inoperative position shown in Fig. 9 against the stress of the spring 3680. The latter at the same time holds the rearward extension of the crank arm 3615 drawn forward and hence the detent 3650 rocked upward as to its rear portion and in the path of the stop lug 3617 as shown in Fig. 9. When the adding machine crank arm 110ᴿ is moved rearwardly, however, the spring 3680 rocks the crank arm 3616 rearwardly and hence the detent 3651 toward the stop lug 3617 and into the path of the latter as soon as its rear end has passed the detent in question. Hence it will be seen that no second operation of the motor drive upon the parts of the adding machine can take place until those parts have returned to normal position. At the same time repeated displacement of the manually controlled detent is not necessary in order to repeat operations of the adding machine. On the contrary said detent can be displaced and held so indefinitely and the adding machine will be repeatedly operated to the limit of its speed capacity but not beyond.

The devices employed for displacing the manually controlled detent are of the following description differing from what is disclosed in this connection in my aforesaid prior patent: A bar 3698 extends from front to rear of the adding machine above the top of the same along the right side of the key-board whose keys are designated by the numeral 291. This bar can therefore be touched by the operator wherever his hand happens to rest when completing the setting up of an amount upon the key-board. This is desirable both for the convenience of the operator and as a time-saving expedient and of course in the ordinary use of an adding machine the operator's hand may chance to be at any place on the key-board from front to rear thereof as varying amounts are set up. As a rule in operating a power-driven adding machine the operator simply turns his hand as he plays the amount keys so as to simply bring the side of the hand against the starting device which for this reason as well as that already mentioned would best take the form of an elongated bar. In the present instance the bar 3698 is mounted upon legs 3622 and 3624 slotted as shown at 3622ᵃ and 3624ᵃ to engage cross-pins or rods 3656ᵃ between the usual upper and lower plates of the adding machine key-board, these plates as well as the keys of the machine being slotted to accommodate said lugs so that the latter may slide vertically with freedom. The leg 3622 is notched at the lower end to straddle a stud or pin on the front end of a lever 3612 which is pivoted intermediate its length on a cross-rod 200 of the adding machine, the rear arm of this lever being joined to a bracket 3620 holding the upper end of the beforementioned rod 3670. The rear leg 3624 of the starting bar is similarly notched at its lower end to straddle a pin or stud at the rear end of a lever 3613 pivoted intermediate its length upon a cross-rod 200ᵃ of the adding machine. The forward end of this last mentioned lever is notched to embrace a pin 3655ᵃ in an upstanding lug of the rear arm of the lever 3612 as clearly shown in Fig. 6.

It will be seen that the above described construction provides for an even depression of the starting bar regardless of the point in the same at which pressure is applied, for the reason that the rocking of either one of the levers by pressure on the bar above its outer arm produces corresponding rocking of the other lever and an equal lowering of the starting bar at the end opposite that where pressure is applied to it. Depression of this bar by rocking the lever 3612 elevates the rod 3670 and thus rocks the detent 3650 with the result hereinbefore described.

It will now be seen that the above described construction is well calculated to thoroughly fulfil all of the objects primarily stated. At the same time it is to be understood that this construction is susceptible of considerable modification without departing from the scope of the invention. Consequently in claims which follow essential elements are recited without limitation to details of construction.

What is claimed is:

1. In a machine of the character described, the combination of a drive shaft equipped for manual operation, a second shaft spaced therefrom and operatively connected therewith, and a power drive applied to said second shaft to operate it and the first shaft independently of manual operation of the latter but permitting manual operation thereof independently of the drive.

2. In a machine of the character described, the combination of an oscillating drive shaft equipped for manual operation, a second oscillating shaft spaced therefrom and operatively connected therewith, a power drive applied to said second shaft to move it in one direction, and a spring for returning said shaft and the first named shaft to normal position; the two shafts being manually operable independently of the said power drive.

3. The combination with driven machine elements and a rotary power drive, of a clutch whose driven member carries a rotary clutch closer with a stop projection, detents engaging opposite sides of said projections and means for controlling said detents manually and by the driven machine elements.

4. The combination with the driven machine elements and a rotary power drive, of a clutch whose driven member carries a rotary clutch closer with a stop projection having curved faces at opposite sides, detents engaging said curved faces respectively and means for controlling said detents manually and by the driven machine elements.

5. The combination with the driven machine elements and a rotary power drive; of a clutch whose driven member carries a rotary clutch closer with a stop projection having curved faces at opposite sides, a pair of rocking detents with curved faces to engage those of said projection respectively, and means for controlling said detents manually and by the driven machine elements.

6. The combination with the driven machine elements, of a power drive applied thereto, a clutch having an automatic closer with a stop projection, a manually controlled detent normally engaging said projection at one side, and a second detent adapted to engage said projection at the opposite side but normally out of the path of the same, said second detent being under control of the driven machine elements and adapted to enter the path of the projection during return of said parts to normal.

7. The combination with the driven machine elements, of a power drive applied thereto, a clutch having an automatic closer with a stop projection, a manually controlled detent normally engaging said projection at one side, and a second detent adapted to engage said projection at the opposite side but normally out of the path of the same, said second detent being under control of the driven machine elements and adapted to enter the path of the projection to restrain the closer short of its normal position during return of said parts to normal.

8. The combination with the driven machine elements, of a power drive applied thereto, a clutch having an automatic closer with a stop projection having curved contact faces at opposite sides, and a pair of rocking detents with curved faces to engage those of said projection, respectively, one of said detents being manually controlled and the other under control of the driven machine elements; substantially as and for the purpose described.

9. The combination with the driven machine elements, of a power drive applied thereto, a clutch having an automatic closer with a stop projection having curved contact faces at opposite sides, and a pair of rocking detents with curved faces to engage those of said projection, respectively, one of said detents being manually controlled and normally engaged with the stop projection and the other of said detents being under control of the driven machine elements and normally disengaged from the projection but adapted during the return of said driven machine elements to normal to engage the projection and prevent reëngagement between the same and the manually controlled detent.

10. The combination with the driven machine elements and a rotary power drive, of a clutch whose driven member carries a rotary clutch-closer with a stop-projection, a manually controlled detent normally engaging said projection at one side, and a second detent adapted to engage said projection at the opposite side but normally out of the path of the same, said second detent being under control of the driven machine elements and adapted to enter the path of the projection during return of said parts to normal.

11. The combination with the driven machine elements and a rotary power drive, of a clutch whose driven member carries a rotary clutch-closer with a stop-projection, a manually controlled detent normally engaging said projection at one side, and a second detent adapted to engage said projection at the opposite side but normally out of the path of the same, said second detent being under control of the driven machine elements and adapted to enter the path of the projection to restrain the closer short of its normal position during return of said parts to normal.

12. The combination with the driven machine elements and a rotary power drive, of a clutch whose driven member carries a rotary clutch-closer with a stop-projection having curved contact faces at opposite sides, and a pair of rocking detents with curved faces to engage those of said projection, respectively, one of said detents being manually controlled and the other under control of the driven machine elements; substantially as and for the purpose described.

13. The combination with spring-held reciprocatory driven machine elements and a power drive for moving such elements in opposition to the spring pressure; of a clutch having an automatic closer with a stop projection, a manually controlled detent normally engaging said projection at one side, and a normally restrained second detent adapted to engage said projection at the opposite side but normally out of the path of the same, said second detent being under control of the driven machine elements and adapted to enter the path of the projection during the spring return of the driven machine elements.

14. The combination with spring-held reciprocatory machine elements and a power drive for moving such elements in opposition to the spring pressure; of a clutch having an automatic closer with a stop projection, a manually controlled detent normally engaging the latter to restrain said closer, a second detent mounted to rock into and out of the path of the said stop-projection and spring-pressed into such path, and a link connected with said detent and having a slot and pin connection with the reciprocatory machine elements.

15. The combination with the driven machine elements, of a power drive applied thereto, a clutch having an automatic closer with a stop projection and a pair of rocking detents to engage said projection at opposite sides and connected by a spring tending to engage the detents with the projection, one detent being manually controlled and the other under control of the said driven machine elements; substantially as and for the purpose described.

16. In a machine of the character described, the combination of a continuously rotating shaft; a driven shaft; a clutch; an eccentric element on said driven shaft; a spring-held main shaft of the machine proper; and a pitman applied thereto and intermittently engaged by the said eccentric element which wipes past and disengages from the pitman leaving the latter free to be spring-returned to normal position.

17. In a machine of the character described, the combination of a continuously rotating shaft; a driven shaft; a clutch; a cam on the driven shaft; a spring-held main shaft of the machine proper; and a pitman applied thereto and intermittently engaged by the said cam which wipes past and disengages from the pitman leaving the latter free to be spring-returned to normal position.

18. The combination with spring-held reciprocatory machine elements, of a power drive for moving such elements in opposition to the spring-pressure comprising a cam, a pitman, a radius link supporting one end of the latter, and a crank arm jointed to the other end of said pitman and operatively connected with the said machine elements.

19. The combination with spring-held reciprocatory machine elements, of a power drive for moving such parts in opposition to the spring-pressure comprising a snail-back cam, a pitman, a radius link supporting one end of the latter, and a crank arm jointed to the other end of said pitman and operatively connected with said machine elements.

20. In a machine of the character described, the combination with the rows of depressible amount keys; of a depressible bar extending alongside the same; a power drive and detent; and connections between the latter and opposite end portions of said bar.

21. In a machine of the character described, the combination with the rows of depressible amount keys; of a depressible bar extending alongside the same and having depending legs spaced apart longitudinally of the bar; a power drive and detent; and connections between the latter and the legs of said bar.

22. In a machine of the character described, the combination with driven machine elements, a power drive and a clutch and clutch detent; of a depressible starting bar, and levers pivoted intermediate their ends and jointed at their outer ends to opposite ends of said bar and jointed together between their pivots and operatively connected to the detent.

23. In a machine of the character described, the combination with driven machine elements, a power drive, clutch, and clutch detent: a depressible starting bar, levers pivoted intermediate their ends and jointed at their outer ends to opposite ends of said bar and jointed together between their pivots, and a detent connected with said levers; substantially as and for the purpose described.

24. In a machine of the character described, the combination with driven machine elements, a power drive, clutch and clutch detent; of a depressible starting bar, levers pivoted intermediate their ends and jointed at their outer ends to opposite ends of said bar and jointed together between their pivots, one of said levers being extended beyond their point of union, and a detent connected with said extended lever; substantially as and for the purpose described.

JESSE G. VINCENT.

Witnesses:
ALVAN MACAULEY,
H. H. PHELPS.